W. F. DOHERTY, Jr.
VEHICLE SPRING.
APPLICATION FILED MAR. 3, 1916.
1,223,678.
Patented Apr. 24, 1917
2 SHEETS—SHEET 1.
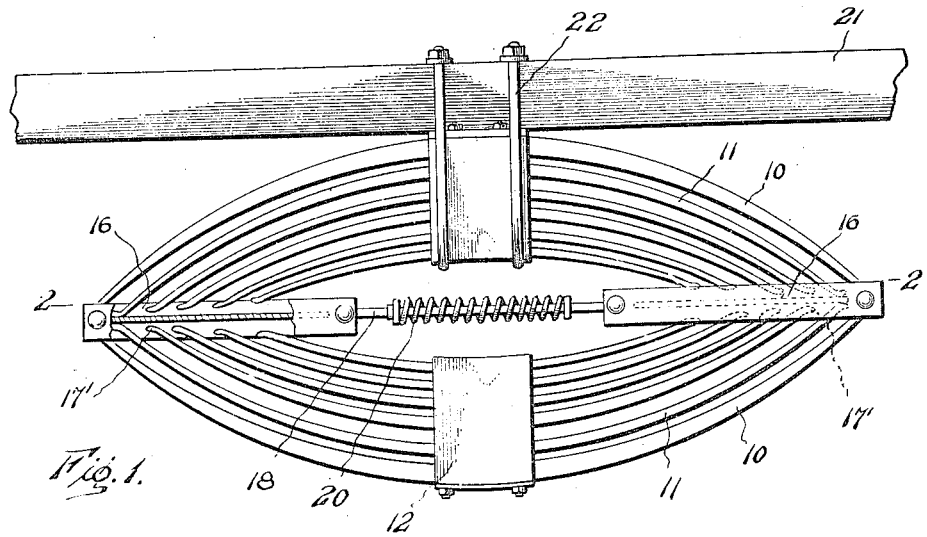
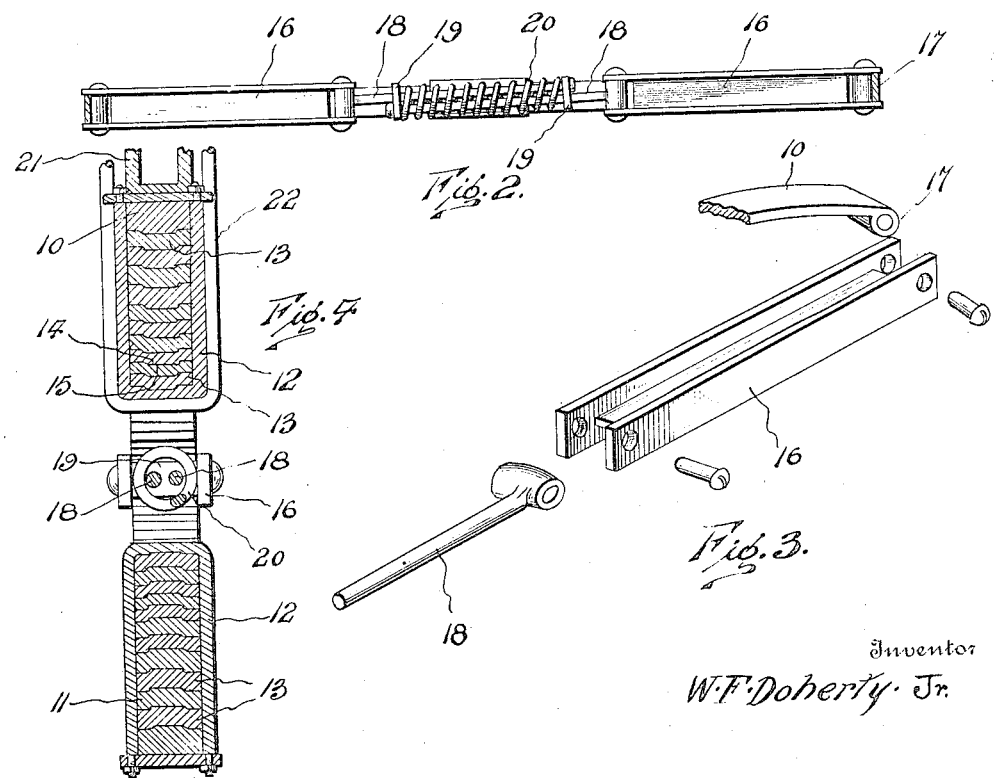
Inventor
W. F. Doherty, Jr.
By
Attorneys W. F. DOHERTY, Jr.
VEHICLE SPRING.
APPLICATION FILED MAR. 3, 1916.
1,223,678.
Patented Apr. 24, 1917.
2 SHEETS—SHEET 2.
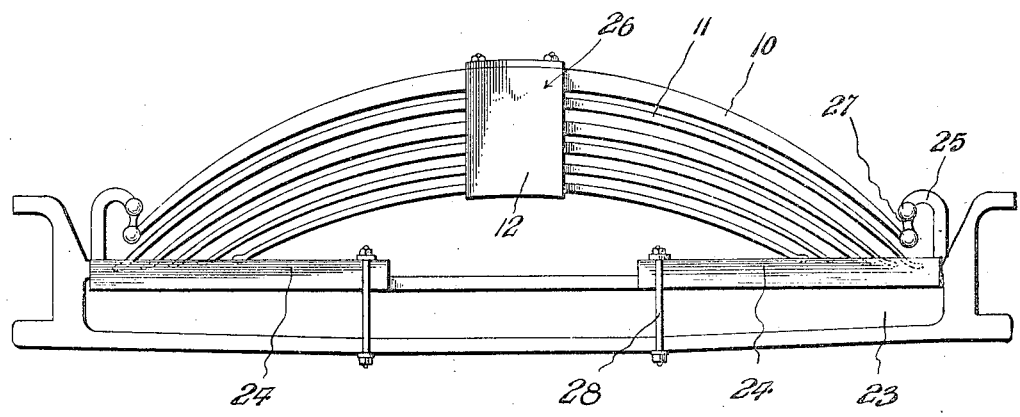
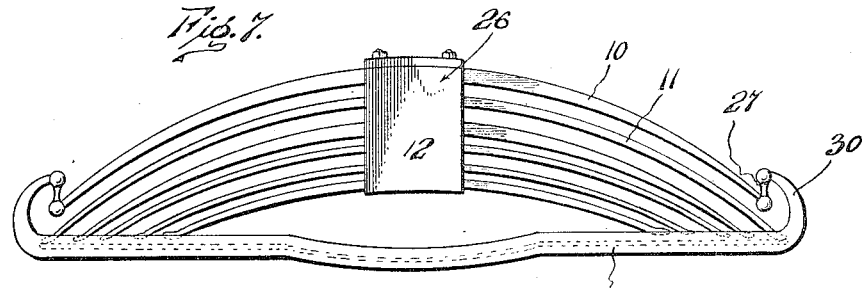
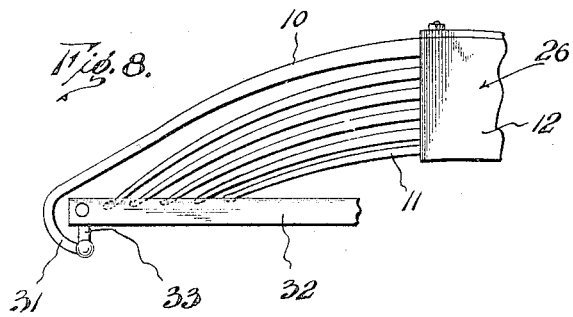
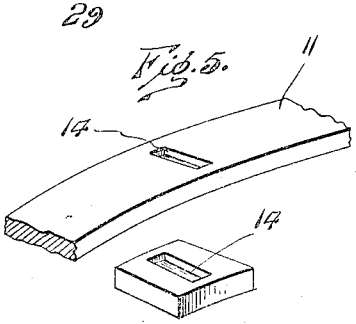
Inventor
W. F. Doherty, Jr.
By
[signature], Attorneys

UNITED STATES PATENT OFFICE.

WILLIAM F. DOHERTY, JR., OF BISBEE, ARIZONA.

VEHICLE-SPRING.

1,223,678.

Specification of Letters Patent.

Patented Apr. 24, 1917.

Application filed March 3, 1916. Serial No. 81,893.

*To all whom it may concern:*

Be it known that I, WILLIAM F. DOHERTY, Jr., a citizen of the United States, residing at Bisbee, in the county of Cochise and State of Arizona, have invented certain new and useful Improvements in Vehicle-Springs, of which the following is a specification.

This invention contemplates an improved vehicle spring and has as its primary object to provide a spring more particularly adapted for use upon automobiles or motor vehicles.

The invention has as a further object to provide a spring wherein the cushioning action thereof will be controlled by the weight of the load upon the spring.

A further object of the invention is to provide a spring wherein the rigidity thereof will be increased as the load is increased so that the flexibility of the spring will be directly correlated to the weight of the load and will be varied accordingly as the load is increased or decreased to support a light load or a heavy load with equal resiliency.

And the invention has as a still further object to provide a spring which may be readily attached to and employed in connection with any conventional type of vehicle.

Other and incidental objects will appear as the description proceeds and in the drawings wherein I have illustrated the preferred embodiment of the invention and wherein similar reference characters designate corresponding parts through the several views, Figure 1 is a side elevation showing my improved spring connected to one of the side members of an automobile chassis, Fig. 2 is a horizontal sectional view on the line 2—2 of Fig. 1 and more particularly showing the expansible yieldable connection between the extremities of the master leaves of the spring, Fig. 3 is a fragmentary perspective view showing the mounting of the rods of the said expansible connection.

Fig. 4 is a vertical sectional view more particularly showing the mounting of the leaves of the spring, Fig. 5 is a fragmentary perspective view showing one of the spacer blocks between adjacent leaves of the spring and the manner in which the said blocks and leaves are provided with mating locking ribs and grooves for holding the springs against longitudinal shifting movement relative to each other, Fig. 6 is a side elevation of a slightly modified form of the invention showing a semi-elliptic spring embodying the principle of my invention, connected to the front axle of a motor vehicle, Fig. 7 is a similar view showing a further modification in the mounting of the spring wherein the spring is connected directly to the vehicle axle, and Fig. 8 is a fragmentary side elevation of a further modification in the mounting of the spring.

In carrying out my invention, the spring when embodied in full elliptic form, as shown in Fig. 1 of the drawings, includes opposed upper and lower segments each of which includes a master leaf 10. Supported by the master leaf of each of the said segments, are a plurality of supplemental leaves 11. The leaves of each of the segments are longitudinally bowed and each taper toward opposite ends thereof. Furthermore, it will be observed upon an inspection of Fig. 1 that the leaves of each of the segments are graduated in length and thickness from the master leaf to the innermost supplemental leaf, the master leaf being the longest and thickest while each succeeding inwardly disposed leaf is slightly shorter and is of slightly less thickness.

Connecting the several leaves of each segment at a point substantially midway the ends of the segment is a substantially U-shaped clip or connecting member 12 particularly shown in Fig. 4 of the drawings, this clip being of a width to snugly receive the leaves between the arms thereof. Interposed between the leaves of each of the segments are a plurality of spacer blocks 13 which are fitted between the arms of the clips 12. These blocks and the leaves are provided with mating transversely arranged locking ribs and grooves 14 and 15 respectively as particularly shown in Figs. 4 and 5 of the drawings. These coacting ribs and grooves may, of course, be formed upon the several leaves of the segments in any suitable manner as well as upon the spacing blocks, but preferably, the metal of each of the said leaves is punched out from one side thereof to produce one of the recesses 14 and a corresponding rib 15 upon the opposite side of the said leaf, it being observed that the leaves are thus without openings the presence of which would weaken or impair the efficiency of the leaves. In this connection, attention is directed to the fact that the spacer blocks 13 of each of the segments are graduated in thickness from the master leaf toward the innermost supplemental leaf so that the spacing between adjacent leaves of each segment is reduced as the innermost supplemental leaf is approached.

The upper and lower segments of the spring are arranged in confronting relation and are connected to a chordal body bar which is formed in sections 16. Preferably, the extremities of the master leaves 10 are provided with mating apertured ears 17, as more particularly shown in Fig. 3 which fit between the sides of the body bar sections and are pivotally connected thereto by bolts or other suitable fastening devices with the said master leaves supporting the free extremities of the supplemental leaves 11 in spaced relation to each other and in spaced relation to opposite sides of each of the said sections. The body bar referred to is in the nature of an eye-beam and the sections 16 thereof are arranged between the segments of the spring to provide oppositely disposed channel members adapted to freely receive the contiguous ends of the supplemental leaves 11 which, at their terminals, are preferably deflected to provide laterally directed lugs or bearing portions 17' adapted to engage within the said channels.

Uniting the inner extremities of the sections 16 of the body bar is an expansible connection which includes coacting rods 18 each pivotally connected at one end to one of the sections 16 in the manner illustrated in Fig. 3 of the drawings and provided at its opposite end with a head 19, the head of one rod slidably receiving the intermediate portion of the other rod. Bearing between the heads 19 and arranged to surround the overlapping portions of the said rods is a helical spring 20 acting upon the heads 19 to draw the sections 16 of the body bar inwardly toward each other.

The full elliptic spring thus described may be connected to a vehicle in any suitable manner and in Fig. 1 of the drawings, I have shown said spring associated with a conventional type of side member 21 of an automobile chassis. Connecting the spring to the said side member are U-bolts or other suitable fastening devices 22 arranged to embrace the upper segment of the spring to engage the clip 12 thereof with the said bolts extending around the said side member. As will now be clear, the weight of a load upon the side member 21 will tend to depress or flatten the master leaves 10 against the yieldable tension of the spring 20. Upon the flattening of the master leaves, the free extremities of the supplemental leaves 11 will be moved to engage within the channels of the sections 16 of the body bar and will then coöperate with the said bar and with the master leaves to receive and cushion the load. Preferably, the master leaves 10 will be of such length and thickness and will therefore possess sufficient rigidity to normally support the body of a vehicle connected to the side members 21 so that, under ordinary conditions, the supplemental leaves will be supported in spaced relation to the sections of the body bar. As the load upon the body of the vehicle is then increased necessitating a corresponding increase in the rigidity of the spring to support the load with a resiliency equal to that of the master leaves under the normal weight of the vehicle body, the supplemental leaves 11 will be moved to coact with the said body bar and will thus supply the necessary increased rigidity to the said spring.

It will therefore be seen that the cushioning action of the spring will be controlled by the weight of the load. Furthermore, the rigidity of the spring is increased as the load is increased so that the flexibility of the spring will, at all times, be directly correlated to the weight of the load and will be varied accordingly as the load is increased or decreased to support either a light or a heavy load with substantially an equal degree of resiliency. The purpose in graduating the length and thickness of the spring leaves as heretofore described will now become apparent as will also the purpose in graduating the spacing of the said leaves since by such arrangement, the supplemental leaves when moved to coöperate with the sections of the body bar will successively coact with the master leaves and with each other to gradually increase the rigidity of the spring and thus receive and cushion the load without jars or jerks.

In Fig. 6 of the drawings, I have illustrated a slightly modified structure wherein a semi-elliptic spring embodying the principle of my invention is connected to a conventional type of motor vehicle axle indicated at 23. The body bar of the spring which is in the nature of an I-beam as in the preferred form of the invention is formed of sections 24 which, at their outer extremities, are provided with upstanding brackets or arms 25. Mounted between these brackets is the spring 26 which is identical in construction with each of the segments of the spring previously described. Swingingly supporting the spring 26 upon the brackets 25 are links 27 which are pivotally connected to the extremities of the master leaf of the spring with the supplemental leaves thereof disposed to coöperate with the sections 24 of the body bar. The sections of the body bar are fitted over the axle 23 with the said axle received within the downwardly disposed channels of the said sections and connecting the sections to the axle, are clamps or other suitable fastening devices 28. The extremities of the supplemental leaves in this modified construction, are adapted to be freely received within the uppermost channels of the sections 24 of the body bar and it will be seen that the said leaves will coöperate with the said body bar, with each other, and with the master leaf of the spring to cushion a load in a manner similar to the preferred form of the invention. Furthermore, it will be noted that this modified construction provides a convenient arrangement whereby the spring may be readily attached to or employed in connection with any conventional type of motor vehicle.

In Fig. 7 of the drawings, I have illustrated a further modification showing the manner in which the spring 26 may be attached directly to a vehicle axle. In this modification, the vehicle axle is shown at 29 and is provided at suitable spaced points with upstanding brackets or arms 30 similar to the arms 25 shown in Fig. 6, and the spring is swingingly mounted between the said brackets by the links 27. It will now be noted that the axle 29 provides the body bar of the spring and the spring is supported in such position that the supplemental leaves thereof will coöperate with the said axle, with each other, and with the master leaf of the spring to cushion the load in a manner similar to the other forms of the invention.

In Fig. 8 of the drawings, I have illustrated a still further modification wherein the master leaf of the spring 26 is extended at its extremities to provide inwardly curved terminals 31 adapted to receive the outer extremities of the sections of the body bar one of which is shown at 32 with the master leaf swung below the said sections and freely connected thereto by links one of which is shown at 33. In some instances, this mounting of the spring may be found desirable and it will be noted that the several elements thereof are so arranged that the spring will act to cushion the load in the manner previously described.

It will therefore be seen that I provide a very simple and efficient construction for the purpose set forth and a spring which, while being particularly adapted for use upon motor vehicles, will, nevertheless, be found equally applicable for use in connection with vehicles of other types.

It should be noted that in each of the various forms of my invention above described, the supplemental leaves of the springs are so proportioned that the free ends of each of such leaves are spaced a greater distance from the web of the body bar than the corresponding ends of next adjacent outer spring leaves and a lesser distance than the corresponding ends of next adjacent inner spring leaves. Because of this, a slight increase in the load applied to the spring as a whole will force the outer supplemental spring into engagement with the body bar while successive further increases will bring the other leaves into operation in succession. It should further be noted that the vertical flanges or webs of the body bar are of sufficient height to act as guides for the free ends of all of the supplemental leaves in all positions which they may occupy.

Having thus described my invention, what I claim and desire to secure by Letters Patent is:

1. A vehicle spring including a body bar, a master leaf connected thereto, and a plurality of supplemental leaves supported upon the master leaf in spaced relation to each other and in spaced relation to the body bar to coöperate therewith with the space between the free ends of said supplemental leaves and the body bar gradually increasing from the outermost supplemental leaf to the innermost supplemental leaf.

2. A vehicle spring including a body bar provided with flanges, a master leaf connected to the body bar, and a supplemental leaf connected with the master leaf and supported to coöperate with the body bar with the free extremities of said supplemental leaf received between said flanges to be held against lateral displacement thereby.

3. A vehicle spring including a body bar, a master leaf connected thereto, and a plurality of supplemental leaves connected with the master leaf and arranged to confront the body bar, all of the said leaves being decreased in length and thickness from the master leaf to the innermost supplemental leaf with the supplemental leaves arranged to successively coöperate with the body bar.

4. A vehicle spring including a body bar, a master leaf connected thereto, and a plurality of supplemental leaves associated with the master leaf, the supplemental leaves being supported in spaced relation to each other and to the master leaf with the spacing between the said leaves decreased from the master leaf.

5. A vehicle spring including a body bar, a master leaf connected thereto, and a plurality of supplemental leaves associated with the master leaf, the supplemental leaves being supported in spaced relation to each other and to the master leaf, and means for supporting the said leaves in spaced relation with the said means graduated in thickness from the innermost supplemental leaf to the master leaf.

6. A vehicle spring including a body bar, a master leaf connected thereto, and a plurality of supplemental leaves connected with the master leaf and supported in spaced relation to each other and to the body bar to successively contact therewith beginning with the outermost supplemental leaf under the weight of a load upon the master leaf.

In testimony whereof I affix my signature.

WILLIAM F. DOHERTY, JR. [L. S.]